(12) United States Patent
Kawaguchi et al.

(10) Patent No.: US 10,205,211 B2
(45) Date of Patent: Feb. 12, 2019

(54) THERMAL INSULATION WAVEGUIDE AND WIRELESS COMMUNICATION DEVICE

(71) Applicant: KABUSHIKI KAISHA TOSHIBA, Tokyo (JP)

(72) Inventors: Tamio Kawaguchi, Kanagawa (JP); Noritsugu Shiokawa, Kanagawa (JP); Hiroaki Ikeuchi, Kanagawa (JP); Tadahiro Sasaki, Tokyo (JP); Kohei Nakayama, Kanagawa (JP); Mutsuki Yamazaki, Kanagawa (JP); Hiroyuki Kayano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 260 days.

(21) Appl. No.: 15/259,395

(22) Filed: Sep. 8, 2016

(65) Prior Publication Data

US 2017/0077580 A1    Mar. 16, 2017

(30) Foreign Application Priority Data

Sep. 14, 2015 (JP) ................................. 2015-180840

(51) Int. Cl.
*H01P 5/02* (2006.01)
*G01S 7/03* (2006.01)
*G01S 7/02* (2006.01)

(52) U.S. Cl.
CPC ............... *H01P 5/028* (2013.01); *G01S 7/02* (2013.01); *G01S 7/03* (2013.01)

(58) Field of Classification Search
CPC ............... H01P 5/028; G01S 7/02; G01S 7/03
See application file for complete search history.

(56) References Cited

U.S. PATENT DOCUMENTS

| | | | | | |
|---|---|---|---|---|---|
| 3,564,546 | A | * | 2/1971 | Kay et al. ................. | G01S 7/38 333/229 |
| 4,227,096 | A | * | 10/1980 | Frosch .................... | G01R 23/06 327/102 |
| 5,105,200 | A | * | 4/1992 | Koepf .................... | H01Q 1/364 333/101 |
| 5,194,833 | A | * | 3/1993 | Dougherty .............. | H01P 3/003 333/246 |
| 5,455,594 | A | * | 10/1995 | Blasing .................. | H01Q 1/364 343/700 MS |

(Continued)

FOREIGN PATENT DOCUMENTS

| | | |
|---|---|---|
| JP | 2636550 | 4/1997 |
| JP | 09-321505 | 12/1997 |

(Continued)

*Primary Examiner* — Bernarr E Gregory
(74) *Attorney, Agent, or Firm* — Finnegan, Henderson, Farabow, Garrett & Dunner, L.L.P.

(57) ABSTRACT

A thermal insulation waveguide between a high-temperature unit and a low-temperature unit in a vacuum, chamber of an embodiment, the thermal insulation waveguide includes, a first substrate including a first line in the high-temperature unit, a second substrate including a second line in the low temperature unit, and a thermal insulation element connecting the substrates, and including a third line including an inductance component and connecting the first and second lines. The first substrate includes a first capacitor unit connected with the first line. The second substrate includes a second capacitor unit connected with the second line.

16 Claims, 11 Drawing Sheets

(56) References Cited

U.S. PATENT DOCUMENTS

| | | | | |
|---|---|---|---|---|
| 5,790,078 | A * | 8/1998 | Suzuki | H01Q 1/247 29/600 |
| 5,950,444 | A * | 9/1999 | Matsunaga | H01L 23/445 165/185 |
| 6,094,114 | A * | 7/2000 | Mohwinkel | H01L 23/66 257/664 |
| 6,367,266 | B1 * | 4/2002 | Kobayashi | F16L 59/16 343/720 |
| 6,441,697 | B1 * | 8/2002 | Garland | H01P 1/047 257/728 |
| 6,515,561 | B2 | 2/2003 | Tamura et al. | |
| 6,609,290 | B1 * | 8/2003 | Takahashi | H01P 1/20363 29/599 |
| 6,698,224 | B2 * | 3/2004 | Kagaya | H01L 23/445 257/E23.096 |
| 7,206,605 | B2 * | 4/2007 | Hattori | H04B 1/036 417/152 |
| 7,379,023 | B2 * | 5/2008 | Yamanaka | H01Q 9/0407 343/700 MS |
| 2002/0000902 | A1 | 1/2002 | Tamura et al. | |
| 2002/0187902 | A1 | 12/2002 | Kai et al. | |

FOREIGN PATENT DOCUMENTS

| | | | |
|---|---|---|---|
| JP | 2001-339208 | 12/2001 | |
| JP | 3513081 | 1/2004 | |
| JP | 4236408 | 12/2008 | |
| JP | 2015-173425 | 10/2015 | |
| WO | WO94/02972 A1 * | 2/1994 | H01Q 1/288 |

* cited by examiner

THERMAL INSULATION WAVEGUIDE AND WIRELESS COMMUNICATION DEVICE

CROSS-REFERENCE TO RELATED APPLICATION

This application is based upon and claims the benefit of priority from Japanese Patent Application No. 2015-180840, filed on Sep. 14, 2015; the entire contents of which are incorporated herein by reference.

FIELD

Embodiments described herein relate to a thermal insulation waveguide and a wireless communication device.

BACKGROUND

In inputting or outputting a microwave signal to/from a device such as a superconducting filter or a low-noise amplifier, which is operated at a very low temperature where a temperature difference from an ordinary temperature (around 300 K) is 150 kelvin (K) or more, microwaves need to be transmitted between the ordinary temperature and the very low temperature. To maintain the very low-temperature environment, it is desirable to suppress a heat inflow from an outside. Therefore, a thermal insulation waveguide that transmits the microwaves with a low loss while suppressing the heat inflow is necessary. As such a thermal insulation waveguide, a method of using a member having poor thermal conductivity for the thermal insulation waveguide or a transmission path provided with a gap in the middle of a waveguide tube has been proposed.

As a method of transmitting a signal having high thermal insulation, a method of achieving both of thermal insulation and a low loss property by dividing the waveguide tube and having a gap to suppress heat intrusion, and providing a reflecting plate to suppress deterioration of a pass characteristic of a high frequency signal, and a method of configuring a transmission line using a member having poor thermal conductivity, and loading the transmission line between a high-temperature unit and a low-temperature unit to suppress heat intrusion, are known.

In a case of using a structure that achieves both of the thermal insulation and the low loss property by dividing the waveguide tube and providing the gap to suppress the heat intrusion, and providing the reflecting plate to suppress deterioration of the pass characteristic of the high frequency signal, there is a problem that the structure has a large sectional area and is tall, and is thus not suitable for downsizing, due to the limitation on the structure by use of the waveguide tube. Further, to decrease in the sectional area of the waveguide tube, a method of loading a dielectric inside the waveguide tube (dielectric mounted-type gap waveguide tube) is also known. However, in this case, a heat inflow amount is increased due to heat radiation between dielectrics having larger emissivity than typical metals. Further, in a case of using the waveguide tube as a waveguide, there is also a problem that a loss is increased due to mismatch in converting the waveguide tube into a planar circuit system such as a filter or a low-noise amplifier.

Meanwhile, in the method of suppressing the heat intrusion using the member having poor thermal conductivity for the transmission path, the limitation on the structure is smaller than the waveguide tube structure. However, the member having poor thermal conductivity is used as a member that configures the transmission path. Therefore, there is a problem that a dielectric loss in a high frequency is typically large, and thus the pass characteristic of the signal is deteriorated and the low loss property is deteriorated. Further, in a case of configuring a microstrip or a coplanar line, a ground surface is required, and thus there is a problem that the heat intrusion through a ground layer becomes large. Therefore, when the transmission path is used to configure a circuit having a low loss property such as a superconducting device, there is a problem that a loss in the transmission path of the circuit becomes large, and superconducting characteristics cannot be fully used. Therefore, a small thermal insulation waveguide having a small heat inflow amount and a small microwave transmission loss is required.

DETAILED DESCRIPTION

A thermal insulation waveguide between a high-temperature unit and a low-temperature unit in a vacuum chamber of an embodiment, the thermal insulation waveguide includes, a first substrate including a first line in the high-temperature unit, a second substrate including a second line in the low temperature unit, and a thermal insulation element connecting the substrates, and including a third line including an inductance component and connecting the first and second lines. The first substrate includes a first capacitor unit connected with the first line. The second substrate includes a second capacitor unit connected with the second line.

(First Embodiment)

A first embodiment relates to a thermal insulation waveguide. The thermal insulation waveguide of the first embodiment is a thermal insulation waveguide between a high-temperature unit and a low-temperature unit in a vacuum chamber, the thermal insulation waveguide including a first substrate including a first line in the high-temperature unit, a second substrate including a second line in the low temperature unit, a thermal insulation element connecting the substrates, and including a third line including an inductance component and connecting the lines, wherein the first substrate includes a first capacitor unit connected with the first line, and the second substrate includes a second capacitor unit connected with the second line. In the thermal insulation waveguide of the embodiment, a signal transmission line on the first substrate including the first line is a first signal transmission line, a signal transmission line on the second substrate including the second line is a second signal transmission line, an signal transmission line on the thermal insulation element including the third line is a third signal transmission line. The first signal transmission line and the second signal transmission line are connected with the third signal transmission line. In the thermal insulation waveguide of the embodiment, microwaves are transmitted in wired lines including the first signal transmission line, the third signal transmission line, and the second signal transmission line. Note that, in the embodiment, waves in a frequency band from 10 MHz to 10 GHz are the microwaves. Further, as a structure of the waveguide, various suitable structures such as a strip line and a coplanar line, in addition to a microstrip line, can be employed. Note that, in a plurality of embodiments below, common description is appropriately omitted.

Figure 1:
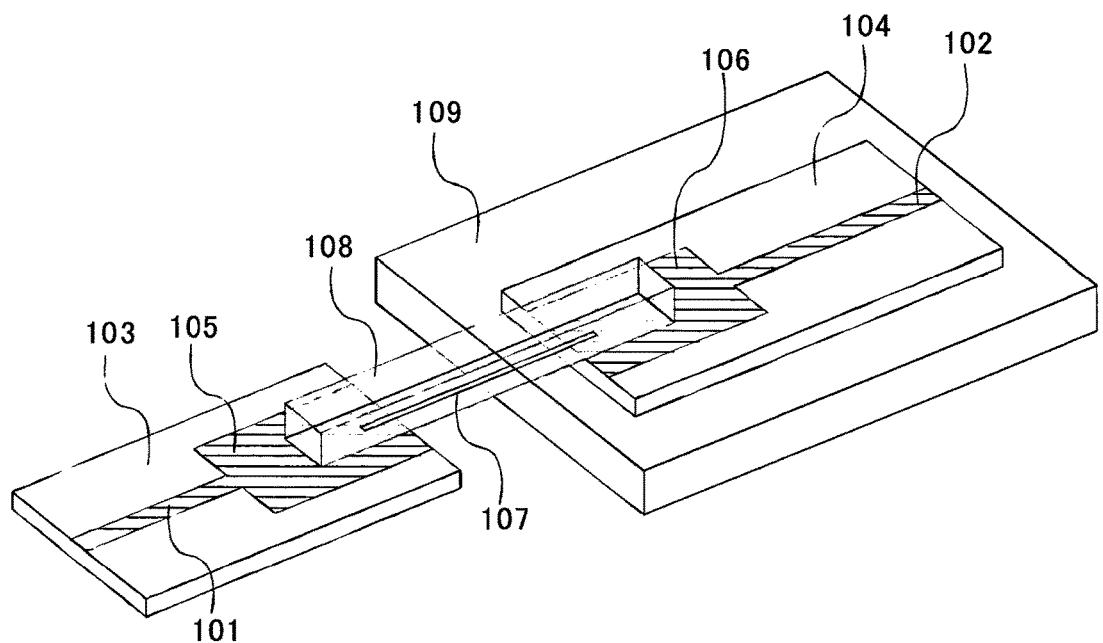
FIG. 1 is a perspective conceptual diagram of a structure of a thermal insulation waveguide according to a first embodiment.
Figure 2:
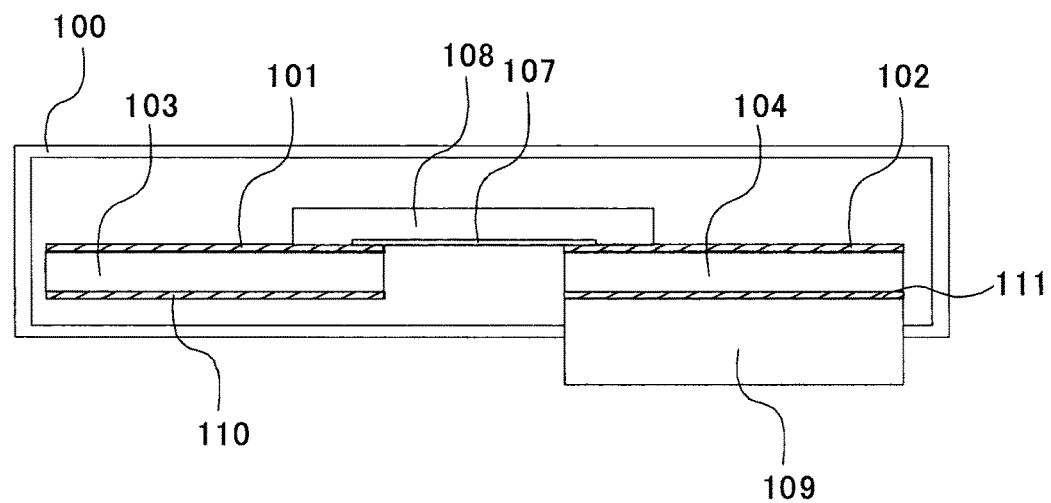
FIG. 2 is a sectional conceptual diagram of the structure of the thermal insulation waveguide according to the first embodiment.

A perspective conceptual diagram of a structure of the thermal insulation waveguide according to the first embodiment is illustrated in FIG. 1, and a sectional conceptual diagram of the structure of the thermal insulation waveguide according to the first embodiment is illustrated in FIG. 2. Note that the thermal insulation waveguide is accommodated in a vacuum chamber 100 not illustrated in FIG. 1. The thermal insulation waveguide of the first embodiment is a thermal insulation waveguide housed in the vacuum chamber 100, and includes a high-temperature side and a low-temperature side. A first line 101, a first substrate 103, a first patch electrode 105, and a first ground layer 110 are included at the high-temperature side of the thermal insulation waveguide. Further, a second line 102, a second substrate 104, a second patch electrode 106, a cooler 109, and a second ground layer 111 are included at the low-temperature side of the thermal insulation waveguide. Then, the high temperature-side first substrate 103 and the low temperature-side second substrate 104 are connected with a first thermal insulation element 108 and a third line 107. In FIG. 1, to illustrate the third signal transmission line 107, the first thermal insulation element 108 is illustrated in a transparent manner. In FIG. 1, illustration of the first ground layer 110 and the second ground layer 111 existing on a back surface side of the substrate is omitted.

Figure 3:
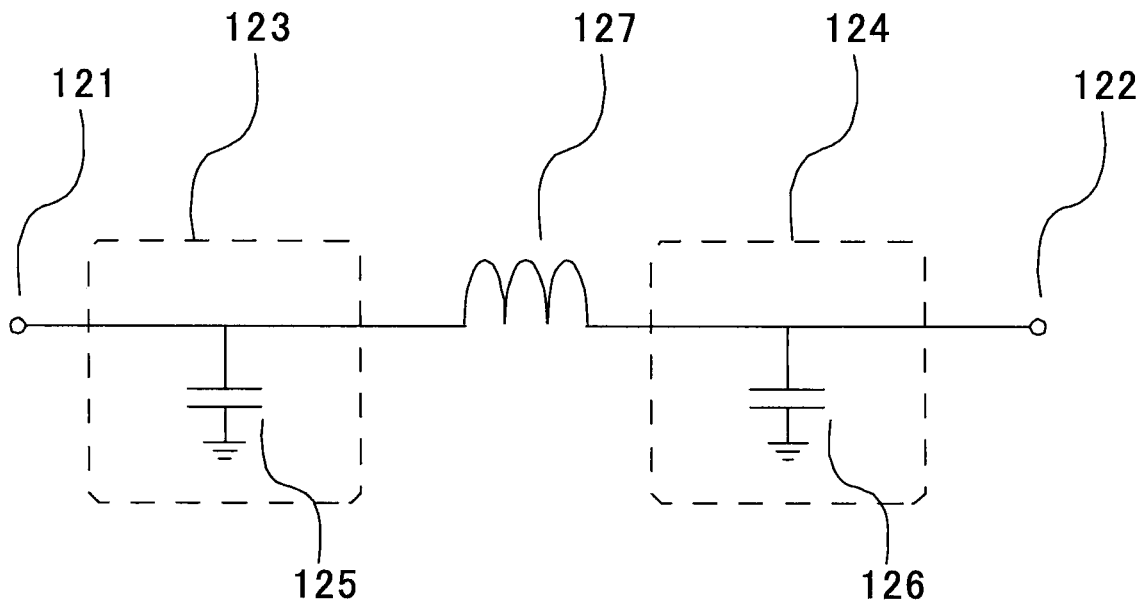
FIG. 3 is an equivalent circuit of the thermal insulation waveguide according to the first embodiment.

FIG. 3 illustrates an equivalent circuit of the thermal insulation waveguide of the first embodiment. The equivalent circuit of FIG. 3 includes an input/output terminal 121 of a high-temperature side 123, an input/output terminal 122 of a low-temperature side 124, a first capacitance component 125, a first inductance component 127, and a second capacitance component 126. The first inductance component 127 is connected with the first capacitance component 125 and the second capacitance component 126, and the first capacitance component 125 and the second capacitance component 126 are grounded. The first capacitance component 125 is a capacitance component of the first capacitor unit formed between the first patch electrode 105 and the first ground layer 110. The second capacitance component 126 is a capacitor component of the second capacitor unit formed between the second patch electrode 106 and the second ground layer 111. The first inductance component 127 is an inductance component of the third signal transmission line. The input/output terminal 121 of the high-temperature side 123 and the input/output terminal 122 of the low-temperature side 124 are terminals connected with other members not illustrated in FIGS. 1 and 2. As illustrated in the equivalent circuit of FIG. 3, the thermal insulation waveguide of the embodiment configures a C-L-C three-stage low-pass filter. To allow an objective microwave to pass through, the inductance component of the third signal transmission line is determined and a cutoff frequency is determined, and a capacitor capacity is determined based on these values. Then, to obtain an objective capacitor capacity, the sire of the patch electrode and the like can be appropriately designed.

(Vacuum Chamber)

The vacuum chamber 100 is a vacuum thermal insulation chamber that accommodates at least the thermal insulation waveguide. The vacuum chamber 100 is a chamber that keeps the temperature and a decompression state in a space where the thermal insulation waveguide is arranged. The vacuum chamber 100 is configured from, for example, a metal member such as stainless steel or aluminum. Although not illustrated, a pump for decompressing the inside of the vacuum chamber 100 is provided and connected with the vacuum chamber 100. In the vacuum chamber 100, circuit elements such as a band-pass filter and a low-noise signal amplifier (not illustrated) may exist at the low-temperature side cooled by the cooler 109.

(First Line)

The first line 101 is a wire that transmits a high frequency signal, exists on the high temperature-side first substrate 103, and has a microstrip-line structure. The first line 101 and the first patch electrode 105 configure the first signal transmission line. The first line 101 is electrically connected with, the third signal transmission line 107 through the first patch electrode 105. The first line 101 is favorably a metal wire. An example of the metal wire includes a metal wire containing at least one metal selected from the group consisting of; copper, gold, silver, aluminum, and nickel. The first line is electrically connected with a high-temperature (ordinary-temperature) member outside the vacuum chamber 100 with a line (not illustrated), for example.

(Second Line)

The second line 102 is a wire that transmits a high frequency signal, exists on the low temperature-side second substrate 104, and has a microstrip-line structure. The second line 102 is cooled by the cooler 109. The second, line 102 and the second patch electrode 106 configure the second signal transmission line. The second line 102 is electrically connected with the third signal transmission line 107. As the second line 102, a normal conductor or a superconductor is favorably used. As the normal conductor, the material exemplified in the first line 101 is favorably used. As the superconductor, an oxide superconductive material including at least, one element selected from the group consisting of; Y, Ba, Cu, La, Ta, Bi, Sr, Ca, and Pb is favorably used. The second line 102 is electrically connected with circuit elements such as cooled band-pass filter and low-noise signal amplifier (not illustrated).

(First Substrate)

The first substrate 103 is a substrate arranged to face the second substrate 104 through a space. The first line 101 and the first patch electrode 105 exist on a front surface of the first substrate 103. The ground layer 110 exists on a back surface of the first substrate 103. A dielectric substrate made of aluminum or the like is used as the first substrate 103. As the first substrate 103, a substrate having a low dielectric loss in a microwave region is favorably used.

(Second Substrate)

The second substrate 104 is a substrate arranged to face the first substrate 103 through a space. The low temperature-side second substrate 104 is cooled by the cooler 109. The second line 102 and the second patch electrode 106 exist on a front surface of the second substrate 104. The ground layer 111 exists on a back surface of the second substrate 104. In a case where the second line 102 and the second patch electrode 106 are normal conductors, a dielectric substrate similar to the first substrate 103 is favorably used as the second substrate 104. In a case where the second line 102 and the second patch electrode 106 are superconductors, a substrate used for a superconductive material such as $Al_2O_3$, MgO, $LaALO_3$, or $SrTiO_3$ is favorably used as the second substrate 104. As the second substrate 104, a substrate having a low dielectric loss in a microwave region is favorably used.

(First Patch Electrode)

The first patch electrode 105 is a wire that transmits a high frequency signal, exists on the high temperature-side first substrate 103, and has a patch shape for forming the second capacitor unit between the first patch electrode 105 and the ground. The first patch electrode 105 is electrically connected with the first line 101. The first patch electrode 105 and the first ground layer 110 sandwich the dielectric first substrate 103, thereby to configure the first capacitance component 125. For the first patch electrode 105, the material exemplified in the first line 101 is favorably used, and the first patch electrode 105 is favorably configured from the same material as the first line 101.

(Second Patch Electrode)

The second patch electrode 106 is a wire that transmits a high frequency signal, exists on the low temperature-side second substrate 104, and has a patch shape for forming the second capacitor unit between the second patch electrode 106 and the ground. The second patch electrode 106 is electrically connected with the second line 102. The second patch electrode 106 and the second ground layer 111 sandwich the dielectric second, substrate 102, thereby to configure the second capacitance component 126. For the second patch electrode 106, the normal conducting or superconductive material, exemplified in the second line 102 is favorably used, and the second, patch electrode 106 is favorably configured from the same material as the second line 102.

(Third Line)

The third line 107 is a fine wire that transmits a high frequency signal, and serves as the third signal transmission line existing on the first thermal insulation element 108. The third line 107 as a fine wire is operated as the first inductance component 127. The third line 107 is electrically connected with the first signal transmission line and the second signal transmission line. The third line 107 is electrically connected with the first line 101 and the second line 102. In the embodiment, the high-temperature side substrate and the low temperature-side substrate are divided into separate substrates, and the substrates are connected with the third signal transmission line, so that the thermal conduction between the substrates is decreased. The first line 101 is favorably a metal wire. An example of the metal wire includes a metal wire containing at least one metal selected from the group consisting of; copper, gold, silver, aluminum, and nickel. To make heat transfer between the high-temperature side and the low-temperature side through the third line 107 small, the thickness of the third line 107 is favorably 50 µm or less, more favorably 10 µm or less.

A high frequency signal passes through a conductor portion of the thermal insulation waveguide of the embodiment, and thus the conductor portion favorably has a high frequency resistance that is as low as possible. For example, in the present structure, a copper fine wire having a rectangular parallelepiped shape with the width of 0.15 mm and the thickness of 0.01 mm can be used as the third line 107. In this case, the heat intrusion occurs through the conductor portion, and thus the film thickness of the conductor is favorably small, and the line width is favorably narrow. Meanwhile, considering achievement of a low loss of a passing signal, the film thickness needs to be larger than a skin depth of the high frequency signal that passes through the film thickness. For example, the skin depth of pure copper of 1 GHz is about 2 µm, and thus a film thickness larger than the skin depth of the frequency band of the signal to pass and as small as possible is desired.

(First Insulation Element)

The first thermal insulation element 108 is a thermal insulation element that supports the third line 107. The third line 107 has low mechanical strength because the third line 107 uses the fine wire for the thermal insulation between the low-temperature side and the high temperature-side. Therefore, to supplement the mechanical strength of the third line 107, the first thermal insulation element 108 is favorably provided on the third line 107. The first thermal insulation element 108 exists on the front surface of the first substrate 103, where the first signal transmission line exists, and on the front surface of the second substrate 104, where the second signal transmission line exists, and connects the first substrate 103 and the second substrate 104. The first thermal insulation element 108 is favorably a member having low thermal conduction. As the first thermal insulation element 108, an insulating member having low thermal conductivity of 1 W/(m·K) or less, such as a glass cloth laminated body, a glass epoxy resin, a glass polyimide resin, a polyimide resin, or a fluororesin, is used. The first, thermal insulation element 108 is provided on a substrate surface, a line surface, or the substrate surface and the line surface. The first thermal insulation element 108, and the substrate surface, the patch electrode surface, or the line surface are favorably joined using an organic adhesive such as an epoxy-based resin, an inorganic adhesive, or soldering.

Here, both of the thermal insulation and the pass characteristic of the high frequency signal can be achieved by connecting the low-temperature substrate and the high-temperature substrate only with a wire. However, considering the heat intrusion, the sectional area of the conductor needs to be as narrow as possible. Therefore, in a case where the substrates are connected with a very narrow metal wire, the strength is not sufficiently held, and the wire may be damaged due to vibration or the like. Especially, in a case of using a superconductor, thermal compression and vibration by a refrigerating machine are applied, and thus there is a problem that the metal line wire cannot hold sufficient strength. Therefore, the present structure uses a thermal insulation element having high thermal insulation as a support member and patterns a narrow wire thereon, thereby to hold the strength. From the viewpoint of the thermal insulation, the third line 107 is as thin and narrow as possible. Further, in a case where the high-temperature side and the low-temperature side are connected only with a fine wire to allow the high frequency signal to pass through, there is a problem that characteristic impedance becomes discontinuous in that portion and the signal is reflected, and a desired low loss property cannot be realized. Therefore, a capacitor unit is formed in facing end surfaces of the high-temperature side and the low temperature-side, and a low-pass filter-type connection structure serving as the equivalent circuit as illustrated in FIG. 3 is used, so that a low-loss waveguide having excellent thermal insulation can be obtained.

(Cooler)

The cooler 109 is thermally connected with the low temperature-side second substrate 104, and cools the second substrate 104. The temperature of the second substrate 104 is favorably lower than the temperature of the first substrate 103 by 150 K or more by the cooling of the cooler 109 and the structure of the thermal insulation waveguide. For example, in a case of using a high-temperature superconductor for the second line 102 and the second patch electrode 106, the low-temperature side comes to have 77 K or less, and thus the cooling is performed such that a temperature difference between the low-temperature side and the high-temperature side (ordinary temperature) becomes 150 K or more. Due to the high thermal insulation of the thermal insulation waveguide, there is an advantage that the cooler 109 having lower cooling performance than a cooler used for a waveguide having less excellent thermal insulation can be used. In a case of using the superconductive material as a low temperature-side conductor material or in a case of using the superconductive material for a member (for example, a band-pass filter) to which the low-temperature side is connected, the cooling is performed by the cooler 109 until the superconductive material is in a superconducting state. The cooler 109 is configured from, to be specific, a cold head connected with the substrate surface and a refrigerating machine that cools the cold head.

(First Ground Layer)

The first ground layer 110 is a ground wire of the first signal transmission line. The first ground layer 110 is formed on a surface of the first substrate 103 at an opposite side to the surface where the first signal transmission line is formed. The wire shape of the first ground layer 110 is formed to cover the entire back surface of the first substrate 103, for example. Further, the wire shape of the first ground layer 110 is designed in consideration of the capacity of the first capacitor unit to be formed. For the first, ground layer 110, a conductive material similar to those of the first line 101 and the first patch electrode 105 is used.

(Second Ground Layer)

The second ground layer 111 is a ground wire of the second signal transmission line. The second ground layer 111 is formed on a surface of the second substrate 104 at an opposite side to the surface where the second signal transmission line is formed. The wire shape of the second ground, layer 111 is formed to cover the entire back surface of the second substrate 104, for example. Further, the wire shape of the second ground layer 111 is designed in consideration of the capacity of the second capacitor unit to be formed. For the second ground layer 111, a conductive material similar to those of the second line 102 and the second patch electrode 106 is used.

In the configuration of the embodiment, the waveguide is configured from the low-pass filter. Therefore, important structures to obtain the thermal insulation are the film thickness of the metal pattern that configures the third line 107 having an inductor component, and the thickness and the length of the line. Considering a high frequency characteristic, the film thickness may just be larger than the skin depth, and may thus be about 7 μm in the pure copper of 100 MHz, and about 2 μm in the pure copper of 1 GHz. Therefore, if the third line 107 has the film, thickness of about 10 μm, the waveguide can support the frequency band of 100 MHz or more. Assume that the high frequency transmitted by the thermal insulation waveguide of the embodiment is a microwave of from 100 MHz to 10 GHz, both inclusive, the thickness of the third line 107 is typically and favorably from 2 to 10 μm, both inclusive, although there are other factors such as the width and the length of the wire.

Next, when the film thickness is made constant, then next, the thickness and the length of the line are designed. As described above, the three-stage low-pass filter is set such that the cutoff comes in a necessary frequency band, a value of necessary inductance is 91.3 nH in 100 MHz, 9.13 nH in 1 GHz, and 0.913 nH in 10 GHz. In a case of configuring the inductance values, where the line width of 0.1 mm is constant, necessary lengths are 70 mm in 100 MHz, 10 mm in 1 GHz, and 1.5 mm in 10 GHz. The heat intrusion of that time becomes 0.001 W in 100 MHz, 0.01 W in 1 GHz, and 0.07 W in 10 GHz when there is the temperature difference of about 230 K between the high-temperature unit and the low-temperature unit. As described above, the necessary inductance value becomes smaller as the frequency becomes higher, and thus the length between the high-temperature unit and the low-temperature unit needs to be short. Therefore, the heat intrusion becomes large. This structure is effective especially in a case of using this structure in a frequency band of 10 GHz or less.

Further, if the line width is made thick, the inductance value becomes small but the sectional area of the metal portion becomes large, and thus there is a problem of an increase in the heat intrusion. Therefore, assuming a case of using a refrigerating machine having cooling capability of about several W, a line width of about 0.3 mm or less is favorably used. For example, in a case of a line width of 0.5 mm in 10 GHz, the heat intrusion becomes about 0.25 w. Therefore, if a plurality of the lines is used, the heat intrusion becomes about several W. In this case, the heat intrusion amount enters a range realized with a coaxial cable, and thus enters a region where the advantage of the embodiment cannot be made use of. Further, if the line width of the fine wire is made too thin, the length between the high-temperature unit and the low-temperature unit becomes too long, and thus the thermal insulation waveguide is increased in the size due to the long distance between the high-temperature unit and the low-temperature unit although the thermal insulation is excellent. Further, if the line width of the fine wire is made too thin, there is a problem that the strength of the fine wire is too low and is easily disconnected. From these points, the line width of the third line 107 is favorably from 0.1 mm to 3 mm, both inclusive.

For example, in a case of a Chebyshev-type low-pass filter in which the cutoff frequency is 1.5 GHz, the inductance value becomes 5.14 nH and the capacitance value becomes 1.33 pF, and thus a structure that realizes the values is arranged on the substrate. Here, the capacitance component is realized by the patch electrode and the inductance component is realized by the fine wire. Accordingly, a low-pass filter-type waveguide can be easily realised, and thus can transmit the high frequency signal with a low loss.

Figure 4:
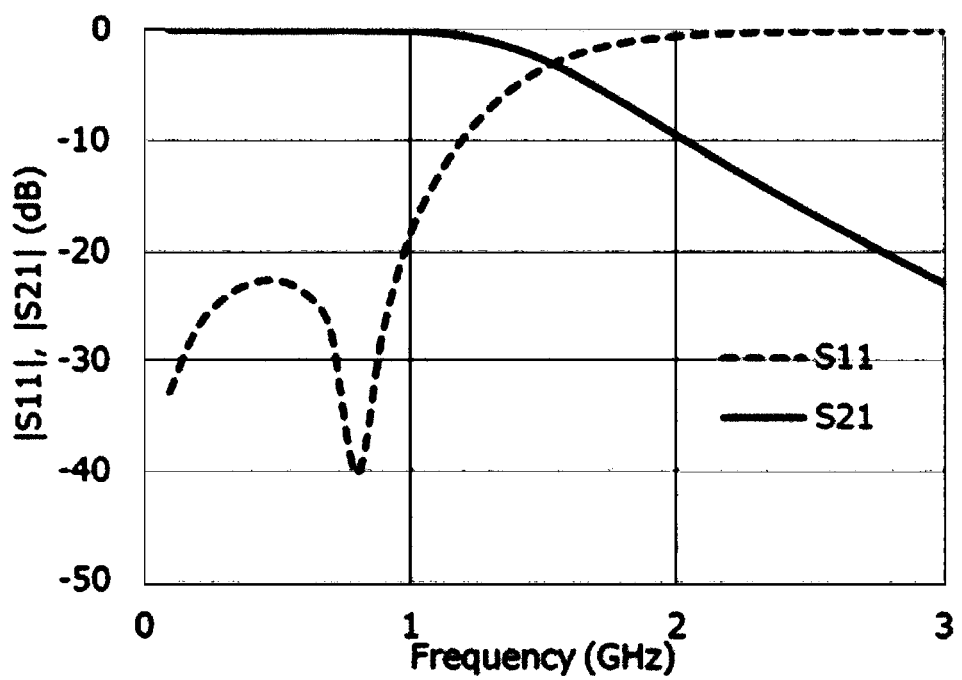
FIG. 4 is a graph illustrating a pass characteristic of the thermal insulation waveguide according to the first embodiment.

FIG. 4 illustrates a result of electromagnetic simulation of frequency characteristics in the thermal insulation waveguide structure of the first embodiment, which is an equivalent circuit of FIG. 3. As a result, a result that the high frequency signal can pass through with a low loss in 1 GHz or less has been obtained. Note that the loss in 1 GHz is about 0.05 dB. Further, because of the low-pass filter type structure, it is found that there is an effect to attenuate a high-frequency region at the same time. This is effective for simplifying a circuit structure in a case of a system such as an amplifier in which higher harmonics become a problem, by use of this structure because no filter needs to be separately prepared or the number of filters can be reduced. Here, although the heat intrusion can be suppressed as the length of the thermally insulative substrate becomes longer, the inductance value becomes large. Therefore, in a region where the cutoff frequency of the low-pass filter is low, such as about 2 GHz or less, the necessary inductance value becomes large, and thus the length of the thermally insulative substrate can be made long and the heat intrusion can be further decreased. Note that, here, the calculation has been performed by using alumina substrates as the high temperature-side substrate and the low temperature-side substrate, copper for the electrodes, and a glass epoxy substrate as the thermally insulative substrate.

Figure 5:
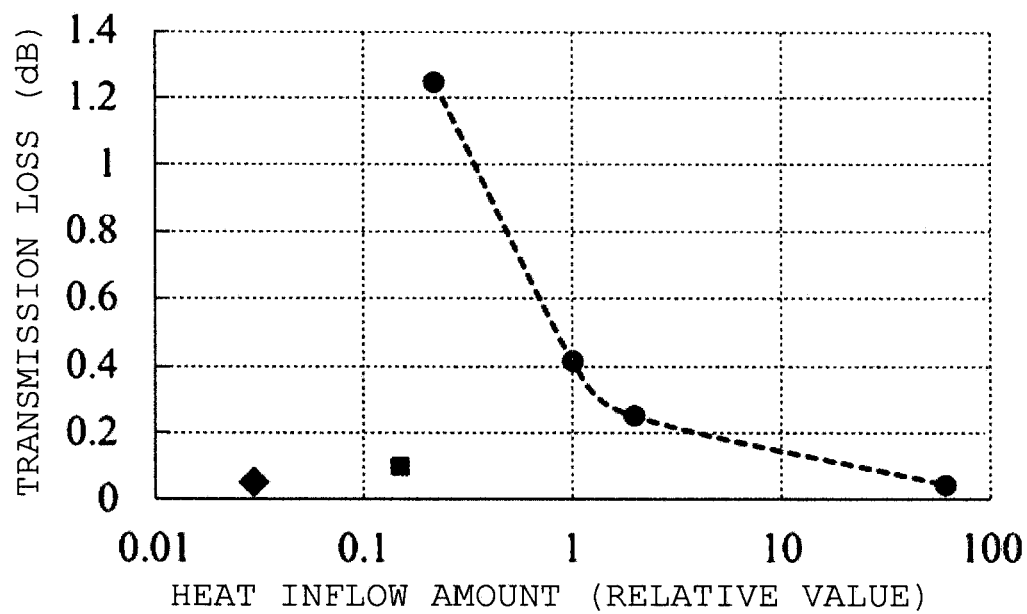
FIG. 5 is a graph illustrating a relationship between an insertion loss and a heat inflow rate between the thermal insulation waveguide according to the first embodiment and a waveguide according to a reference form.

Next, a result of calculation of the heat intrusion amount in this structure based on a typical copper-made coaxial semi-rigid cable with a diameter of 2.2 mm is illustrated in FIG. 5. The round symbols linked with the broken line in FIG. 5 indicate values of the heat intrusion and the pass loss, which can be realized when the diameter and the material of the conventional coaxial cable (10 cm) and the waveguide tube are changed. Meanwhile, as a thermal insulation waveguide having better thermal insulation and a lower loss than the above case, the heat intrusion and the loss of the thermal insulation waveguide are illustrated by the square symbol, the thermal insulation waveguide being configured to suppress the hear intrusion by configuring the transmission line from glass epoxy as the member having poor thermal conductivity, and loading the transmission line between the high-temperature unit and the low-temperature unit. In this case, the thermal conduction becomes about 1/10 and the thermal insulation becomes higher than the cable. Further, when the structure of the embodiment (rhombus symbol) is used, the thermal conductivity becomes about 1/50 of the conventional case, and thus the structure of the embodiment can realize a structure having very high thermal insulation. In addition, the pass loss becomes 0.05 dB, and thus the thermal insulation and the low loss property can be realized at the same time. Here, for the high-temperature side substrate and the low temperature-side substrate, a dielectric having a small dissipation factor in high frequency is used, and a dielectric substrate made of alumina, sapphire, MgO, or $LaAlO_3$, with a low loss, is used. For example, in a case of the alumina substrate with the thickness of 0.5 mm, the line width as the characteristic impedance of 50Ω, which is typically used, is about 0.49 mm.

From the above description, it is clear that the thermal insulation waveguide of the present embodiment is a thermal insulation waveguide having superiority in all of the downsizing, the thermal insulation, and the microwave loss, which are the problems of the conventional technology. In the above description, one of the substrates is placed in the high-temperature unit or the ordinary temperature unit, and the other substrate is placed in the low-temperature unit. However, from the standpoint of the thermal insulation, this technique is effective in a case where a circuit has a very high temperature portion in the middle of the circuit, and the portion needs to be insulated from other circuits.

(Second Embodiment)

Figure 6:
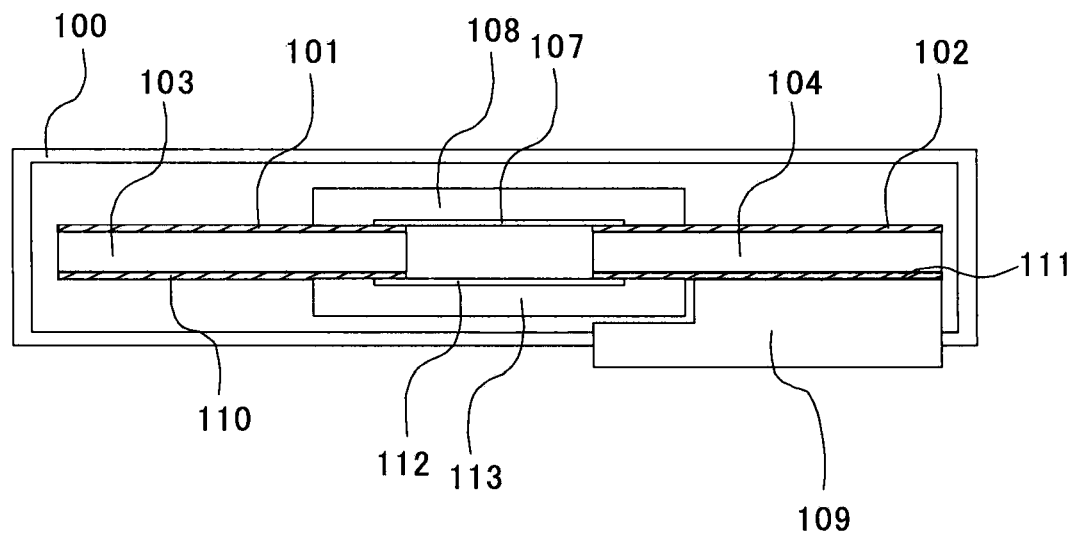
FIG. 6 is a sectional conceptual diagram of a structure of a thermal insulation waveguide according to a second embodiment.

A second embodiment relates to a thermal insulation waveguide, FIG. 6 illustrates a sectional conceptual diagram of a thermal insulation waveguide of the second embodiment. The thermal insulation, waveguide of the second embodiment illustrated in FIG. 6 is a modification of the thermal insulation waveguide of the first embodiment, and has a structure that connects a high temperature-side first ground-side 110 and a low temperature-side ground layer 111, using a second thermal insulation element 113 provided with a fourth line 112. The thermal insulation waveguide of the second embodiment has a similar configuration to the thermal insulation waveguide of the first embodiment except that the ground side is also connected with the line having thermal insulation. Description of common configurations is omitted.

In a case of inputting a high frequency signal to the present structure, if the ground is substantially separated between the high-temperature side and the low-temperature side, there is a problem that the signal cannot be successfully transmitted in a case of inputting a signal in a high frequency band. Therefore, the ground is connected as short as possible with a fine wire arranged in a thermally insulative substrate different from an inductance portion, so that the signal transmission with less signal deterioration becomes possible even if the frequency is high.

The fourth line 112 is favorably a line made of a similar material and having a similar line diameter to a third line 107. Further, the second thermal insulation element 113 is favorably made of a similar material to a first thermal insulation element 108, and is favorably provided to prevent heat transfer between the high temperature-side substrate and the low temperature-side substrate, similarly to the first thermal insulation element 108. Note that a cooler 109 and the second thermal insulation element 113 may be separated as illustrated or may be connected.

(Third Embodiment)

Figure 7:
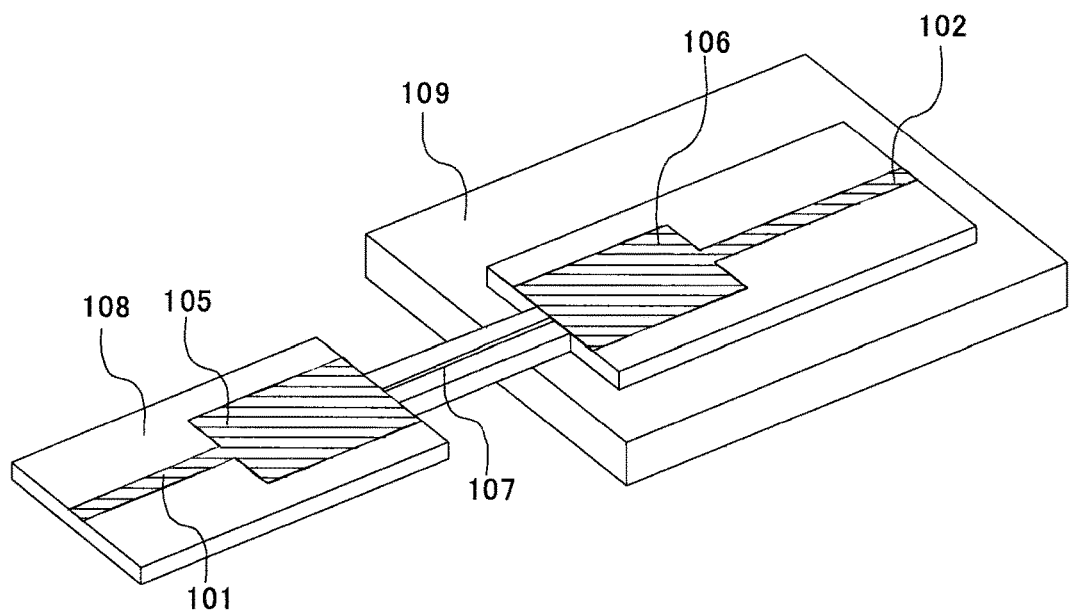
FIG. 7 is a perspective conceptual diagram, of a structure of a thermal insulation waveguide according to a third embodiment.
Figure 8:
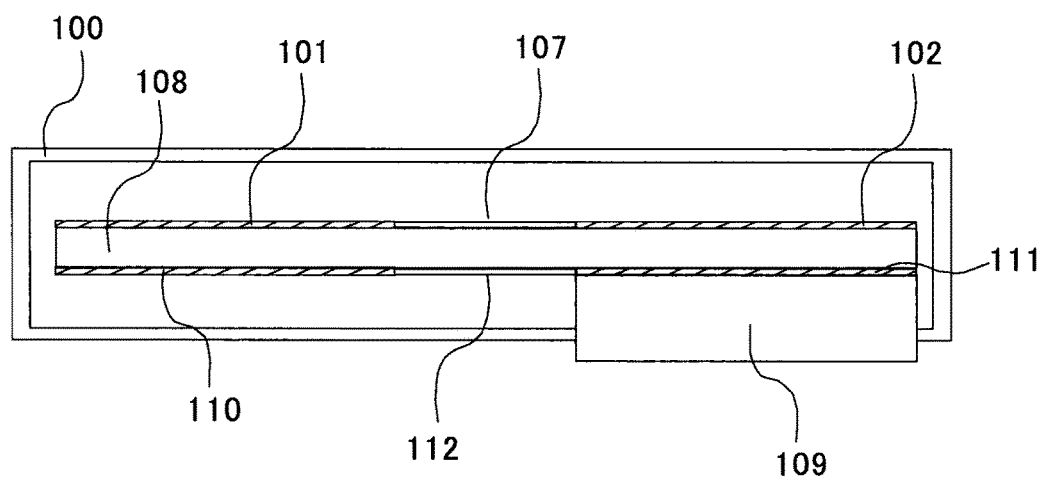
FIG. 8 is a sectional conceptual diagram of the structure of the thermal insulation waveguide according to the third embodiment.

A third embodiment relates to a thermal insulation waveguide. FIG. 7 illustrates a perspective conceptual diagram of the thermal insulation waveguide of the third embodiment, and FIG. 8 illustrates a sectional conceptual diagram of the thermal insulation waveguide of the third embodiment. The thermal insulation waveguide of the third embodiment, is an example in which a high temperature-side first substrate 103, a low temperature-side second substrate 104, and a first thermal insulation element 108 that connects the first substrate 103 and the second substrate 104 are integrally configured from the material of the first thermal insulation element, and a ground side is also connected with a fourth line 112 provided on a member excellent in thermal insulation and having thermal insulation. In FIGS. 7 and 8, the material of the first thermal insulation element 108 is used for the substrate, and thus the first substrate 103 and the second substrate 104 are illustrated as the first thermal insulation element 108. However, the first substrate 103 and the second substrate 104 in the third and first embodiments are common in configurations other than the material. The thermal insulation waveguide of the third embodiment has similar configurations to the thermal insulation waveguide of the first embodiment except that the high-temperature side substrate and the low temperature-side substrate of the first embodiment are configured from the first thermal insulation element 108, and the fourth line 112 at the ground side is provided. Description of common configurations is omitted.

In the configuration of the first embodiment, substrates with a low loss and good thermal conduction, such as alumina substrates, are used as the substrates of the high-temperature unit and the low-temperature unit. However, in a case where a distance between substrates to be connected is very short or the frequency is low, contribution to a loss is not very large, Therefore, the entire circuit is configured on the substrates having high thermal insulation, and a high-temperature unit .and a low-temperature unit can be integrally connected. Therefore, the third embodiment has a structure in which a central portion of the substrates, the central portion connecting the high-temperature unit and the low-temperature unit, is made narrow like the first thermal insulation element 108 of the first embodiment and the line to be connected is also made thin, so that heat intrusion in that portion is suppressed. Therefore, metal patterns are patterned on both surfaces of the first thermal insulation element 108, and an inductance portion serving as a signal transmission portion is made narrow, and the substrate of that portion is made narrow. Further, the fourth line 112 at the ground side is also wired without separately providing a thermal insulation element, so that a waveguide having high thermal insulation can be easily and simply configured.

(Fourth Embodiment)

Figure 9:
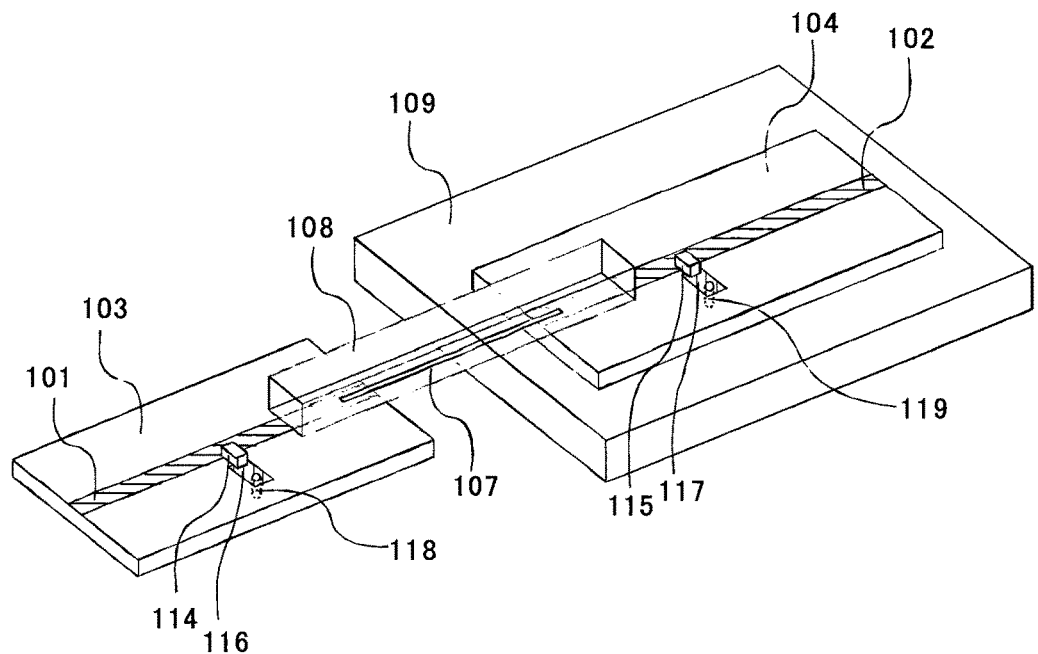
FIG. 9 is a perspective conceptual diagram of a structure of a thermal insulation waveguide according to a fourth embodiment.

A fourth embodiment relates to a thermal insulation waveguide. FIG. 9 illustrates a perspective conceptual diagram illustrating a configuration example of the thermal insulation waveguide according to the fourth embodiment. In the fourth embodiment, a case of using chip parts for a capacitor and an inductor that configure a low-pass filter structure will be described. In the configuration of the conceptual diagram of FIG. 9, a first patch electrode 105 and a second patch electrode 106 are omitted, and a first line 101 and a second line 102 are connected with a third line 107, Further, a first chip capacitor 114 connected with the first line 101 is provided as a high, temperature-side first capacitor unit, a second chip capacitor 115 connected with the second line 102 is provided as a low temperature-side second capacitor unit.

The first chip capacitor 114 is provided between a first electrode 116 and the first line 101 on a first substrate 103. The first electrode 116 is provided in a position on a front surface of the first substrate 103, the position being separated from the first line 101. A first via 118 that electrically connects the front surface and a back surface of the first substrate 103 is provided, the first via 118 electrically connects the first electrode 116 and a first ground layer 110, and the first chip capacitor 114 is connected with the first line 101 and the first ground layer 110. Note that the first electrode 116 and the first via 118 are favorably configured from a similar material to the first patch electrode 105 and the first line 101 described in the first embodiment.

The second chip capacitor 115 is provided between a second electrode 117 and the second, line 102 on a second substrate 104. The second electrode 117 is provided in a position on a front surface of the first substrate 102, the position being separated from the second line 102. A second via 119 that electrically connects the front surface and a back surface of the second substrate 102 is provided, the second via 119 electrically connects the second, electrode 117 and a second ground layer 111, and the second chip capacitor 115 is connected with the second line 102 and the second ground layer 111. Note that the second electrode 117 and the second via 119 are favorably configured from a similar material to the second patch electrode 106 and the second line 102 described in the first embodiment.

Here, as the second chip capacitor 115 arranged in the low-temperature unit, a capacitor having small capacity change at a low-temperature may be favorably used. Here, comparing the thermal insulation waveguide of the first embodiment and the thermal insulation waveguide of the fourth embodiment, the capacitor unit is formed of a chip part, so that the size of the electrode patch can be downsized, and thus the chip part or the like may be used in downsizing the thermal insulation waveguide portion. Further, the ground and the via to be installed have an inductance component, and thus a capacity value needs to be selected in consideration of influence of the inductance component. Further, in a case where a cutoff frequency of a low-pass filter needs to be made lower, downsizing of the structure using the chip parts like the fourth embodiment is effective because the size of the patch electrode becomes too large in the structure of the first embodiment. Note that a chip inductor may be further provided in the middle or an end portion, of the third line 107, so that a numerical value of the inductance component of the thermal insulation waveguide can be adjusted.

(Fifth Embodiment)

A fifth embodiment relates to a thermal insulation waveguide. The thermal insulation waveguide of the fifth embodiment is a thermal insulation waveguide between a high-temperature unit and a low-temperature unit in a vacuum chamber, the thermal insulation waveguide including a first substrate including a first line in the high-temperature unit, a second substrate including a second line in the low temperature unit, and a thermal insulation element connecting the substrates, and including a third line including an inductance component and connecting the lines, wherein the second substrate includes a second capacitor unit connected with the second line, and a first inductor, or the first substrate includes a first capacitor unit connected with the first line, and a second inductor.

Figure 10:
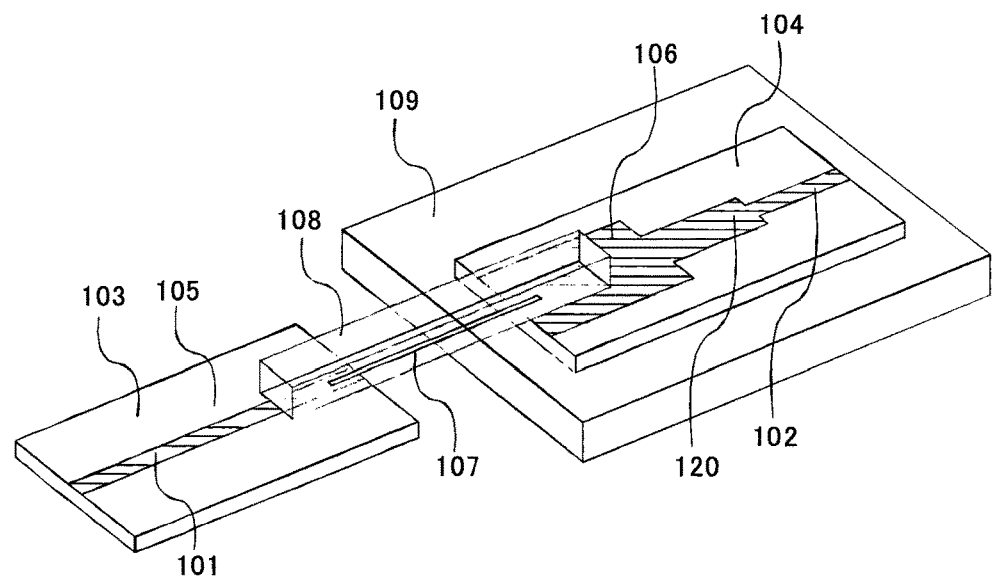
FIG. 10 is a perspective conceptual diagram, of a structure of a thermal insulation waveguide according to a fifth embodiment.
Figure 11:
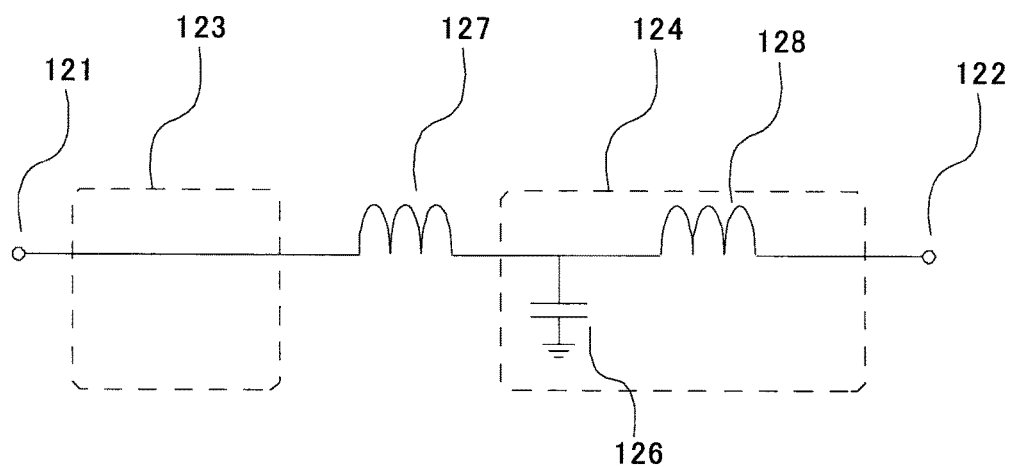
FIG. 11 is an equivalent circuit of the thermal insulation waveguide according to the fifth embodiment.

FIG. 10 is a perspective conceptual diagram, illustrating a configuration example of a thermal insulation waveguide according to a fifth embodiment. In the fifth embodiment, as a method of configuring a low-pass filter structure that configures the thermal insulation waveguide, a case of using an equivalent circuit serving as an L-C-L circuit by omitting a first parch, electrode 105 that configures a high temperature-side first capacitor unit, and providing a first inductor 120 to be connected with a second line 102 at the low-temperature side. FIG. 11 illustrates the equivalent circuit (L127-C126-L128) of the thermal insulation waveguide of the fifth embodiment.

As a circuit structure of the low-pass filter, not only the structure illustrated in FIG. 3 but also the structure illustrated in FIG. 11 or the like may be used. The circuit structure of FIG. 11 has a configuration in which no first capacitor unit is included and thus no first capacitance component 125 is included, and a first inductance component 127 and a second inductance component 128 are included in both end portions of a second capacitance component 126 connected with the ground.

The first inductor 120 is connected with the second line 102, and a transmission, line is made thin, so that a necessary inductance component is realised. As the first inductor 120, a normal conductor or a superconductive material similar to that of the second line 102 is used. In the fifth embodiment, the second line 102, the first inductor 120, and a second patch electrode 106 configure a second signal transmission line, and the first line 101 configures a first signal transmission line.

Note that, in FIG. 10, to configure the L-C-L low-pass circuit, the first inductor 120 is provided at the low-temperature side of FIG. 1, and the first patch electrode 105 that configures the high temperature-side first capacitor unit is omitted. Here, as a modification of the configuration of FIG. 10, a second inductor similar to the first inductor 120 is provided to be connected, with the first line 101 at the high-temperature side, and the second patch electrode 106 that configures a low temperature-side second capacitor unit is omitted, and the second, inductor of a first substrate 103, a capacitor unit of the first substrate 103, and an inductance component of a third line 107 can configure the L-C-L low-pass circuit. In the modification of the configuration of FIG. 10, the first line 101, the second inductor, and the first patch electrode 105 configure the first signal transmission line, and the second line 102 configures the second signal transmission line.

(Sixth Embodiment)

Figure 12:
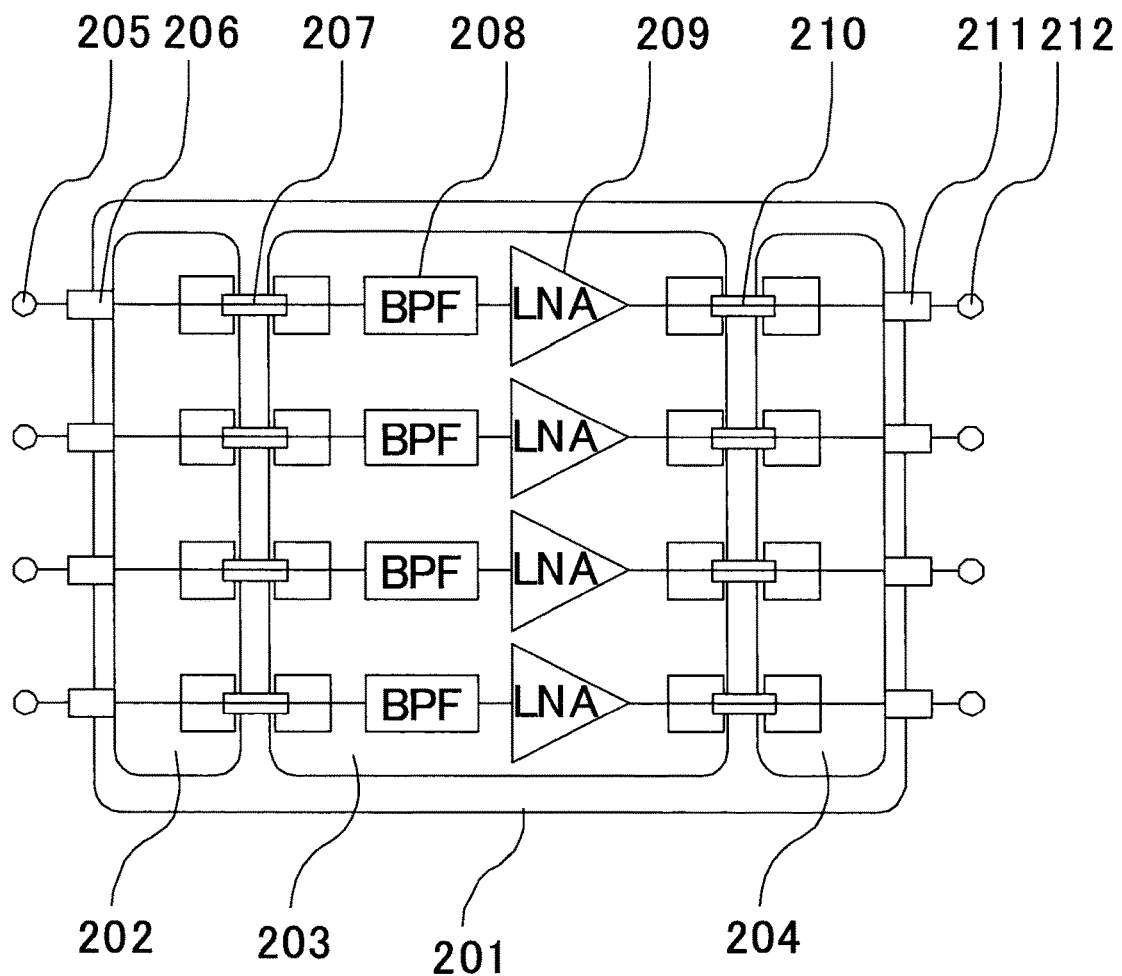
FIG. 12 is a block diagram of a thermal insulation waveguide according to a sixth embodiment.
Figure 13:
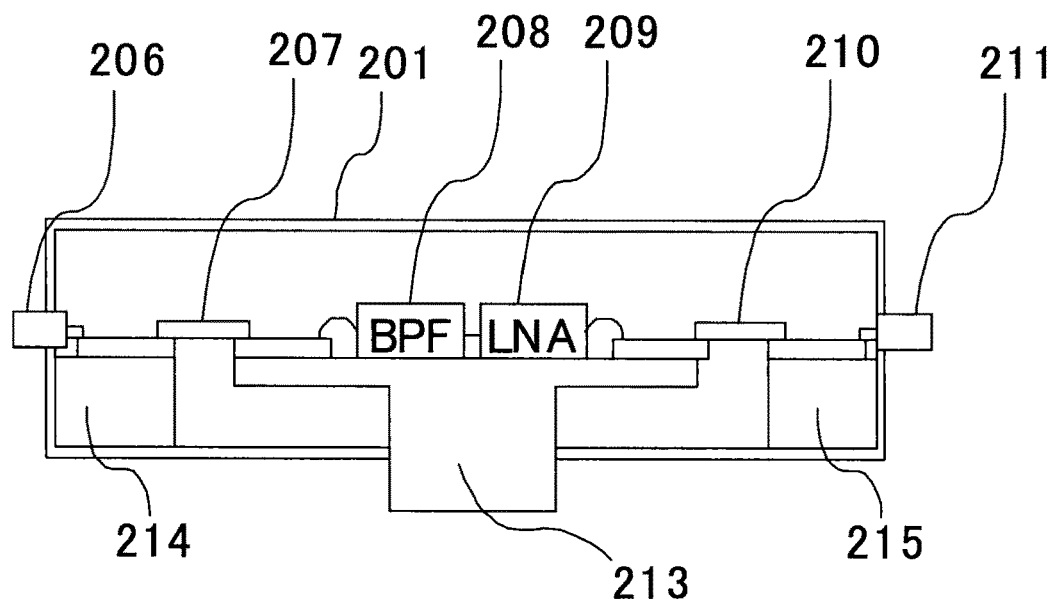
FIG. 13 is a sectional conceptual diagram of a structure of the thermal insulation, waveguide according to the sixth embodiment.

A sixth embodiment relates to a thermal insulation waveguide. FIG. 12 illustrates a block diagram illustrating a configuration example of the thermal insulation waveguide according to the sixth embodiment, and FIG. 13 illustrates a sectional conceptual diagram of the thermal insulation waveguide according to the sixth embodiment. In the sixth embodiment, an example in which the thermal insulation waveguide is applied to a microwave receiving system, using a cooling device is described. The sixth embodiment includes a plurality of the thermal insulation waveguides, and the plurality of thermal insulation waveguides is connected with band-pass filters and low-noise amplifiers, respectively. The thermal insulation waveguides illustrated in FIGS. 12 and 13 have a configuration including a signal input port 205 outside a vacuum chamber 201, the signal input port 205 being connected with an antenna or the like, an output port 212 connected with a signal processing circuit or the low-noise amplifier in a subsequent stage, vacuum connectors 206 and 211 that connect an outside and an inside of the vacuum chamber 201, high-temperature units 202 and 204 in the vacuum chamber, thermal insulation waveguides 207 and 210, and a band-pass filter 208 and a low-noise amplifier 209 mounted between the thermal insulation waveguides 207 and 210 in a low-temperature unit 203, and there is a plurality of the respective systems. The thermal insulation waveguides of the embodiments are used as the thermal insulation waveguides 207 and 210. A low-temperature unit is cooled by a cooler 213. The cooler 213 side of the thermal insulation waveguides 207 and 210, the band-pass filters 208, and the low-noise amplifiers 209 are cooled by the cooler 213 and serve as the low-temperature unit. The thermal insulation waveguides 207 and 210 at a high-temperature unit side are arranged on support substrates 214 and 215 at the high-temperature unit side not cooled, and are connected with high-temperature (ordinary-temperature) external devices outside the vacuum chamber 201.

Typically, in a case of mounting a plurality of systems in a cooling device, refrigerating capacity required for the cooling device becomes very large due to heat intrusion from a portion that connects the high-temperature unit and the low-temperature unit, and thus there is a problem of an increase in the size of the device, Therefore, the present thermal insulation waveguide is used between the high-temperature unit and the low-temperature unit, so that the heat intrusion from an outside can be substantially decreased, and thus there is an advantage of downsizing and reduction of power consumption of the cooling device. Further, by use of the configuration of the thermal insulation waveguide, an effect of a low-pass filter is exhibited, and thus a decrease in higher harmonics of the amplifier and passage of a higher mode through the band-pass filter become possible. Further, by configuring a receiver, having the band-pass filter and the low-noise amplifier arranged in the low-temperature unit, thermal noise can be decreased. Therefore, a highly sensitive receiver with a decreased noise level can be configured.

Here, the band-pass filter and a substrate arranged in the low-temperature unit that configures the thermal insulation waveguide can be made of a conductive material formed on an insulated substrate (not illustrated) as a dielectric substrate. The insulated substrate includes a ground layer on a back surface and a line conductor on a front surface. The conductive material favorably includes a metal such as copper or gold, a superconductor such as niobium or niobium-tin, and a Y-based copper oxide high-temperature superconductor. By use of the superconductor for a conductive pattern, a pass loss of the circuit can be substantially decreased at the time of a superconducting state. Further, the substrate is made of various suitable materials such as magnesium oxide, sapphire, or lanthanum aluminate.

Figure 14:
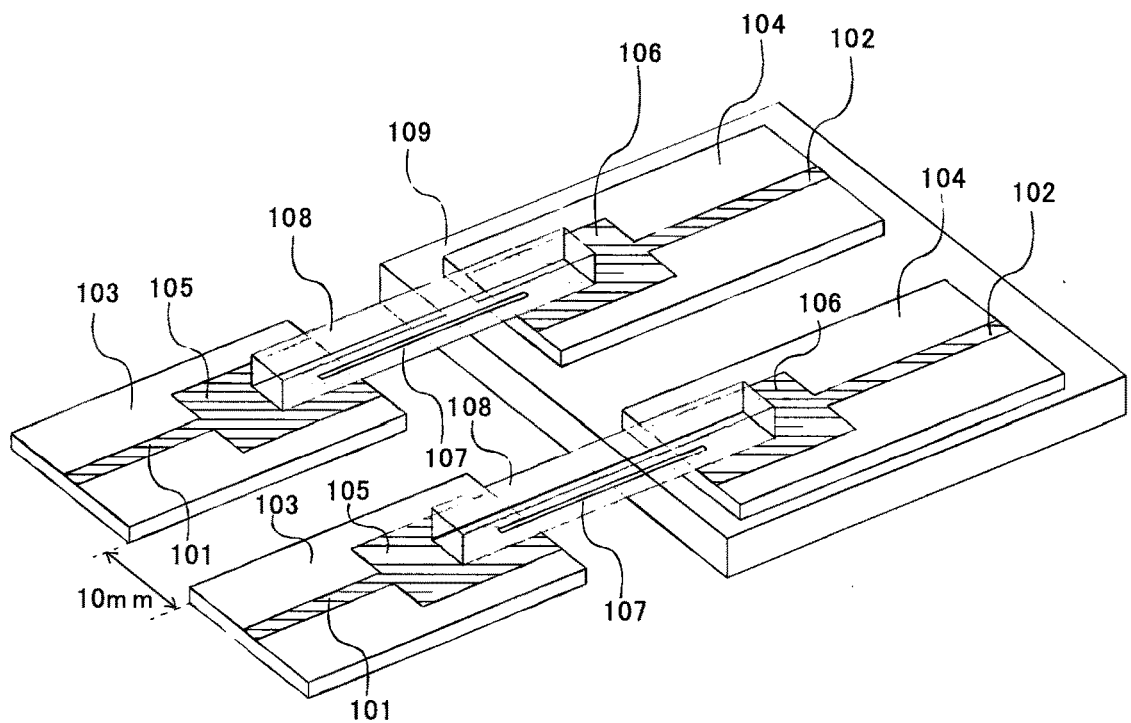
FIG. 14 is a perspective conceptual diagram of the structure of the thermal insulation waveguide according to the sixth embodiment.
Figure 15:
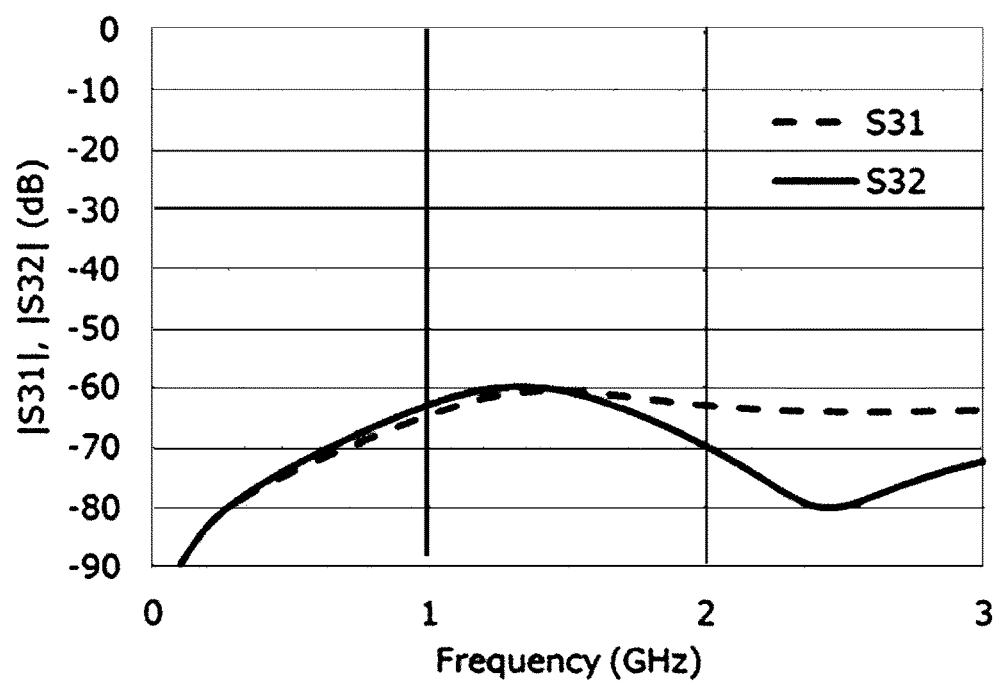
FIG. 15 is a graph illustrating a calculation result of isolation according to the sixth embodiment.

Next, FIG. 14 illustrates a perspective conceptual diagram of a structure used for calculation of an isolation characteristic between adjacent, thermal insulation waveguides, and FIG. 15 illustrates an evaluation result of the isolation characteristic. In a case of mounting a plurality of systems, the isolation characteristic may be deteriorated due to coupling of the adjacent lines. In the structure illustrated in FIG. 15, the isolation characteristic of a case where the interval between the lines is about 10 mm was calculated. As result, the isolation characteristic was about 60 dB or more. Further improvement of the isolation characteristic is possible by separating the interval between the lines or covering the thermal insulation waveguides with a metal wall or the like.

(Seventh Embodiment)

Figure 16:
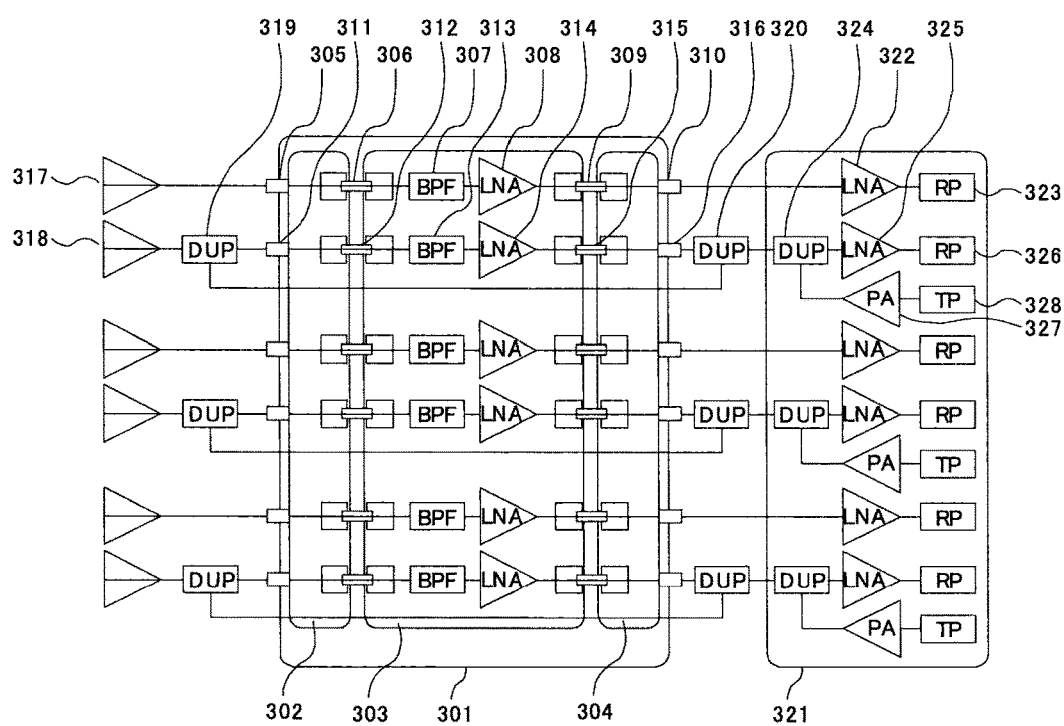
FIG. 16 is a block diagram of a wireless communication device according to a seventh embodiment.

A seventh embodiment relates to a wireless communication device. A thermal insulation waveguide of the embodiment is connected with an antenna. FIG. 16 illustrates a block diagram of a configuration example of a wireless communication device used for a base station device of a mobile phone or the like according to the seventh embodiment. The wireless communication device of the embodiment is configured from a plurality of sectors, and the block diagram of FIG. 16 illustrates an example of three sectors. The wireless communication device has a configuration of using reception diversity by the three-sector configuration divided by 120 degrees, for example. One sector serving as a basic sector is configured from two systems including a reception diversity reception antenna 317 and a transmission/reception common antenna 318. A highly sensitive receiver 301 (vacuum chamber) using the cooler described, in the sixth embodiment, is connected to the reception antenna 317, and an output portion of the receiver 301 is connected with a base station device 321. The highly sensitive receiver 301 includes vacuum connectors 305, 310, 311, an 316 that connect an outside and an inside of the vacuum chamber, high-temperature units 302 and 304 in the vacuum chamber, thermal insulation waveguides 306, 309, 312, and 315, a band-pass filter 307, a low-noise amplifier 308, and a band-pass filter 313 mounted between the thermal insulation waveguides 306 and 309 and between the thermal insulation waveguides 312 and 315 in a low-temperature unit 303, and a low-noise amplifier 314. The thermal insulation waveguides of the embodiments are used as the thermal insulation waveguides 306, 309, 312, and 315.

A reception signal input to the base station device is amplified in a low-noise amplifier 322 in the base station device, and is input to a reception signal processing unit 323 (RP). Meanwhile, a reception signal input from the transmission/reception common antenna 318 passes through a duplexer 319 (DUP), and is connected to the highly sensitive receiver 301. This output, further passes through the duplexer 319, and is connected with the base station device 321. The reception signal input to the base station device passes through a duplexer 324, is amplified in a low-noise amplifier 325 in the base station device, and is input to a reception signal processing unit 326. Meanwhile, a transmission signal output from a transmission signal processing unit 328 (TP) in the base station device 321 is amplified in a signal amplifier 327, passes through the duplexer 324 and the same system as the reception system, and is output. This transmission signal further passes through the duplexer 319, by-passes the highly sensitive receiver 301, is synthesized by the duplexer 324, and is output from the transmission/reception common antenna. In the case of using the highly sensitive receiver by cooling for such a base station, device, the plurality of sectors is required, and thus a plurality of reception units needs to be cooled at the same time. Therefore, the configuration used in the sixth embodiment is applied to this base station device, so that the heat intrusion can be suppressed by the thermal insulation waveguides. The base station device can be applied to a wireless device that cools a plurality of systems at the same time, using a small cooling device, and achievement of high sensitivity of a wireless device becomes possible.

(Eighth Embodiment)

Figure 17:
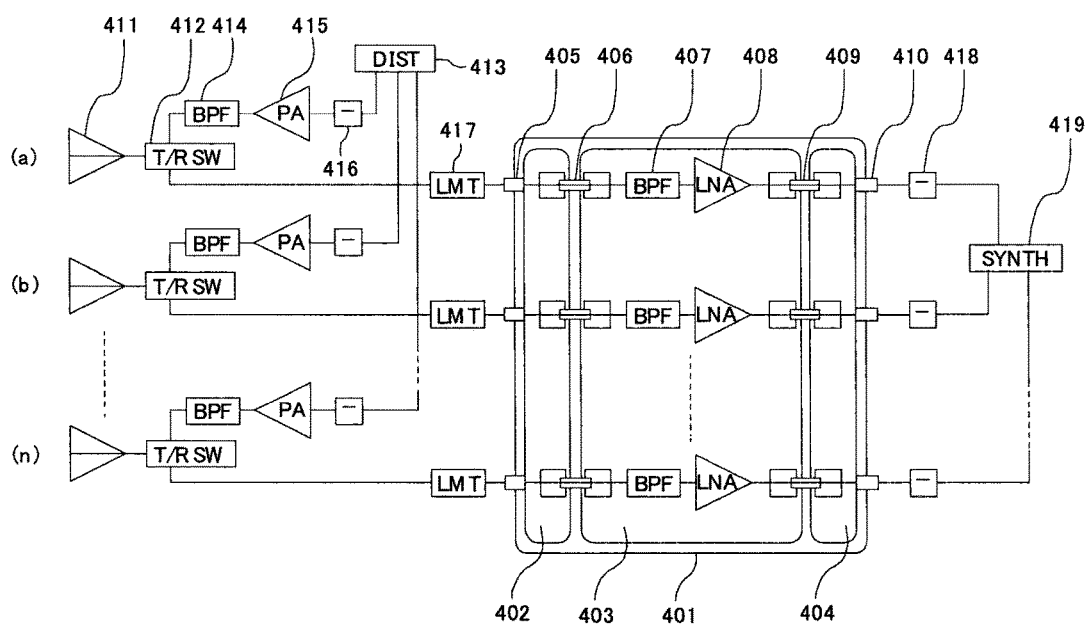
FIG. 17 is a block diagram of a wireless communication device according to an eighth embodiment.

An eighth embodiment relates to a radar device in a wireless communication device. A thermal, insulation waveguide of the embodiment is connected with an antenna. FIG. 17 is a block diagram, illustrating an entire configuration of a wireless communication device of the eighth embodiment. The wireless communication device includes a plurality of antennas (a) to (n). The wireless communication device of the eighth embodiment includes a highly sensitive receiver 401 (vacuum chamber) described in the sixth embodiment. The wireless communication device includes a distributor 413 (DIST), transmission phase shifters 416 (φ) of the antennas (hereinafter, called "transmission phase shifters 416"), power amplifiers 415 of the antennas (hereinafter, called "power amplifiers 415"), transmission band-pass filters 414 (BFF) of the antennas (hereinafter, called "transmission band-pass filters 414"), transmission/reception switchers 412 (T/R SW) of the antennas (hereinafter, called "transmission/reception switchers 412"), antenna units 411 (hereinafter, called "antenna units 411"), limiters 417 (hereinafter, called "limiters 417"), vacuum connectors 405 and 410 (hereinafter, called "vacuum connectors 405 and 410"), first signal transmission thermal insulation waveguides 406 (hereinafter, called "first signal transmission thermal insulation waveguides 406"), band-pass filters 407 (hereinafter, called "band-pass filters 407"), low-noise amplifiers 408 (hereinafter, called "low-noise amplifiers 408"), second signal transmission thermal insulation waveguides 409 (hereinafter, called "second, signal transmission thermal insulation waveguides 409"), reception phase shifters 418 (hereinafter, called "reception phase shifters 418"), and a synthesizer 419 (SYNTH). Further, the reception band-pass filter 407 and the low-noise amplifier 408 are arranged, in a vacuum-insulated chamber, and are cooled to be a low temperature, using a cooler or the like. The first signal transmission thermal insulation waveguide 406 and the second signal transmission thermal insulation waveguide 409 are examples of the "thermal insulation waveguide".

The wireless communication device of the eighth embodiment performs communication using an array antenna in which the plurality of antenna units 411 is arrayed in a planar manner. Note that this wireless communication device can be applied to both of a passive-type array antenna and an active-type array antenna.

The distributor 413 equally distributes and supplies a supplied transmission signal to the transmission phase shifters 416. The transmission phase shifter 416 changes a phase of the transmission signal supplied from the distributor 413 to a desired phase, and supplies the transmission signal to the power amplifier 415. A change amount of the phase by the transmission phase shifter 416 is set for each antenna unit 411. The power amplifier 415 amplifies an amplitude of the transmission signal supplied from the transmission phase shifter 416. The transmission band-pass filter 414 suppresses an unnecessary signal component from the transmission signal amplified by the power amplifier 415. The transmission signal having passed through the transmission band-pass filter 414 is supplied to the transmission/reception switcher 412.

The distributor 413, the transmission phase shifter 416, the power amplifier 415, and the transmission band-pass filter 414 function as a transmission unit, that transmit a transmission signal from the antenna unit 411 as a radio wave.

The transmission/reception switcher 412 includes a circulator or a coaxial switch. The transmission/reception switcher 412 switches a signal system between a reception system including the limiter 417, the reception band-pass filter 403, the low-noise amplifier 408, the reception phase shifter 418, and the synthesizer 419, and a transmission system including the distributor 413, the transmission phase shifter 416, the power amplifier 415, and the transmission band-pass filter 414.

The antenna unit 411 emits the radio wave into a space in response to supply of the transmission signal from the transmission/reception switcher 412. The antenna unit 411 receives the radio wave emitted into the space and generates a reception signal, and supplies the reception signal to the transmission/reception switcher 412. The reception signal is supplied to the limiter 417 through the transmission/reception switcher 412.

The limiter 417 limits a signal level of the reception signal supplied through the transmission/reception switcher 412. For example, the limiter 417 limits the signal level in a case where a reception signal level becomes higher than a saturation level of the low-noise amplifier 408 in a subsequent state. The reception signal with the limited signal level is supplied to the first signal transmission thermal insulation waveguide 406,. The first signal transmission thermal insulation waveguide 406 supplies the reception signal supplied from the limiter 417 to the reception band-pass filter 407. The reception band-pass filter 407 suppresses an unnecessary signal component included in the reception signal supplied from the first signal transmission thermal insulation waveguide 406. The low-noise amplifier 408 amplifies an amplitude of the reception signal that has passed through the reception band-pass filter 407. The low-noise amplifier 408 supplies the amplified reception signal to the reception phase shifter 418 through the second signal transmission thermal insulation waveguide 409. The reception phase shifter 418 changes the phase of the reception signal supplied from the second signal transmission thermal insulation waveguide 409 to a desired phase, and supplies the reception signal with the changed phase to the synthesizer 419. The change amount of the phase by the reception phase shifter 418 is set for each antenna unit 411.

The reception signals are supplied from the plurality of reception, phase shifters 418 to the synthesizer 419. The synthesizer 419 synthesizes the plurality of reception signals into a beam and outputs the signals as a reception beam.

For connection between a high-temperature unit and a low-temperature unit in the vacuum insulated chamber of the highly sensitive receiver 401, an input/output method of transmitting a high frequency signal with a low loss is desired. However, in a case where a plurality of input/output units is required like the present embodiment, heat intrusion becomes too large if a high-frequency cable or the like is used, and there is a problem of an increase in the size of a cooling mechanism. Therefore, the thermal insulation waveguide of the present embodiment is used between the input/output units 405 and 410.

According to the above-described present embodiment, by using the thermal insulation waveguide of the present embodiment for a cooling portion including the plurality of input/output portions in the wireless communication device 1, the heat intrusion can be suppressed and a low-loss transmission path can be configured, and thus a loss or a noise factor can be improved in this portion. By applying the thermal insulation waveguide of the present embodiment to a phased array radar using a low-temperature amplifier or the like, downsizing of the cooling mechanism becomes possible, and a small and high-performance radar device can be realized.

In the specification, a part of elements is expressed only by symbols for element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A thermal insulation waveguide between a high-temperature unit and a low-temperature unit in a vacuum chamber, the thermal insulation waveguide comprising:
    a first substrate including a first line in the high-temperature unit;
    a second substrate including a second line in the low temperature unit; and
    a thermal insulation element connecting the substrates, and including a third line including an inductance component and connecting the first and second lines, wherein
    the first substrate includes a first capacitor unit connected with the first line, and
    the second substrate includes a second capacitor unit connected with the second line.

2. The waveguide according to claim 1, wherein
the second substrate is thermally connected with a cooler and cooled by the cooler, and
a temperature of the cooled second substrate becomes lower than a temperature of the first substrate by 150 K or more.

3. The waveguide according to claim 1, wherein
a part of or all of the second line is a superconductive material.

4. The waveguide according to claim 1, wherein
the thermal insulation element is a glass cloth laminated body, a glass epoxy resin, a glass polyimide resin, a polyimide resin, or a fluororesin.

5. The waveguide according to claim 1, wherein
the first capacitor unit, the second capacitor unit, and the inductance component included in the third line configure a first low-pass filter.

6. The waveguide according to claim 1, wherein
a plurality of the thermal insulation waveguides is included, and
the thermal insulation waveguides are respectively connected with band-pass filters and low-noise amplifiers.

7. A wireless communication device comprising:
    the thermal insulation waveguide according to claim 1; and
    an antenna connected with the thermal insulation waveguide.

8. The wireless communication device according to claim 7, wherein the wireless communication device is a base station device or a radar device.

9. A thermal insulation waveguide between a high-temperature unit and a low-temperature unit in a vacuum chamber, the thermal insulation waveguide comprising:
    a first substrate including a first line in the high-temperature unit;
    a second substrate including a second line in the low temperature unit; and
    a thermal insulation element connecting the substrates, and including a third line including an inductance component and connecting the first and second lines, wherein
    the second substrate includes a second capacitor unit connected with the second line, and a first inductor, or
    the first substrate includes a first capacitor unit connected with the first line, and a second inductor.

10. The waveguide according to claim 9, wherein
the second substrate is thermally connected with a cooler and cooled by the cooler, and,
a temperature of the cooled second substrate becomes lower than a temperature of the first substrate by 150 K or more.

11. The waveguide according to claim 9, wherein
a part or all of the second line is a superconductive material.

12. The waveguide according to claim 9, wherein
the thermal insulation element is a glass cloth laminated body, a glass epoxy resin, a glass polyimide resin, a polyimide resin, or a fluororesin.

13. The waveguide according to claim 9, wherein
the first capacitor unit, the second inductor, and the inductance component included in the third line, or
the second capacitor unit, the first inductor, and the inductance component included in the third line configure a second low-pass filter.

14. The waveguide according to claim 9, wherein
a plurality of the thermal insulation waveguides is included, and
the thermal insulation waveguides are respectively connected with band-pass filters and low-noise amplifiers.

15. A wireless communication device comprising:
    the thermal insulation waveguide according to claim 9; and an antenna connected with the thermal insulation waveguide.

16. The wireless communication device according to claim 15, wherein the wireless communication device is a base station device or a radar device.

\* \* \* \* \*